United States Patent [19]

Wendling et al.

[11] Patent Number: 5,298,580

[45] Date of Patent: Mar. 29, 1994

[54] PROCESS FOR THE PRODUCTION OF VULCANIZABLE MERCAPTAN- AND/OR XANTHOGEN DISULFIDE-REGULATED POLYCHLOROPRENE RUBBERS WITH MINIMAL MOLD FOULING

[75] Inventors: Peter Wendling, Leverkusen; Werner Obrecht, Moers; Michael Happ, Dormagen; Rüdiger Musch, Bergisch Gladbach; Eberhard Müller, Dormagen, all of Fed. Rep. of Germany

[73] Assignee: Bayer AG, Leverkusen, Fed. Rep. of Germany

[21] Appl. No.: 946,655

[22] Filed: Sep. 18, 1992

[30] Foreign Application Priority Data

Sep. 30, 1991 [DE] Fed. Rep. of Germany ....... 4132463

[51] Int. Cl.⁵ .................................................. C08F 2/24
[52] U.S. Cl. .................................. 526/213; 526/216; 526/223; 526/295
[58] Field of Search ................. 526/213, 216, 222, 223

[56] References Cited

U.S. PATENT DOCUMENTS

| | | | |
|---|---|---|---|
| 4,212,780 | 7/1980 | Fitzgerald | 526/213 |
| 4,577,004 | 3/1986 | Emura | 526/222 |
| 4,954,585 | 9/1990 | Obrecht et al. | 526/220 |

FOREIGN PATENT DOCUMENTS

| | | |
|---|---|---|
| 0324173 | 7/1989 | European Pat. Off. . |
| 2535170 | 2/1976 | Fed. Rep. of Germany . |
| 3321902 | 1/1984 | Fed. Rep. of Germany . |
| 49-037118 | 10/1974 | Japan . |
| 53-004031 | 2/1978 | Japan . |
| 58-219206 | 12/1983 | Japan . |
| 1482034 | 8/1977 | United Kingdom . |

*Primary Examiner*—Christopher Henderson
*Attorney, Agent, or Firm*—Connolly & Hutz

[57] ABSTRACT

Vulcanizable, mercaptan- and/or xanthogen-disulfide-regulated polychloroprene rubber are produced by emulsion polymerization of chloroprene and, based on polymerizable monomer used, 0 to 30 parts by weight ethylenically unsaturated, other monomers copolymerizable with chloroprene in an alkaline medium by a process in which (1) 0.1 to 10 parts by weight of a tricyclic diterpene carboxylic acid containing at least two conjugated C=C double bonds per molecule, based on the polymerizable monomer used, and optionally (2) 0.1 to 5 parts by weight, based on polymerizable monomer used, fatty acid esters are used for their production.

The polychloroprene produced in accordance with the invention may be used for the production of vulcanized rubber articles. The polychloroprene rubbers produced by the process according to the invention have a minimal tendency to foul metal molds. The pollution of wastewaters by the process according to the invention is minimal. The well-known favorable properties of polychloroprene remain unaffected.

10 Claims, No Drawings

PROCESS FOR THE PRODUCTION OF VULCANIZABLE MERCAPTAN-AND/OR XANTHOGEN DISULFIDE-REGULATED POLYCHLOROPRENE RUBBERS WITH MINIMAL MOLD FOULING

This invention relates to a process for the production of vulcanizable, mercaptan- and/or xanthogen disulfide-regulated polychloroprene rubber by emulsion polymerization using unmodified resinic acids and, optionally, fatty acid esters.

The production of polychloroprene has long been known and is carried out by emulsion polymerization in an alkaline aqueous medium, cf. "Ullmanns Encyclopä die der technischen Chemie", Vol. 9, page 366, Verlag Urban und Schwarzenberg, Berlin/München 1957; "Encyclopedia of Polymer Science and Technology", Vol. 3, pages 705–730, John Wiley, New York 1965: "Methoden der Organischen Chemie" (Houben-Weyl) XIV/1, 738 et seq., Georg Thieme Verlag, Stuttgart 1961.

In principle, suitable emulsifiers are any compounds which adequately stabilize the emulsion and mixtures thereof, such as for example the water-soluble salts, particularly the sodium, potassium and ammonium salts, of long-chain fatty acids, colophony and colophony derivatives, relatively high molecular weight alcohol sulfates, aryl sulfonic acids, formaldehyde condensates of aryl sulfonic acids, nonionic emulsifiers based on polyethylene oxide and polypropylene oxide and emulsifying polymers, such as polyvinyl alcohol (DE-OS 2 307 811, 2 426 012, 2 514 666, 2 527 320, 2 755 074, 3 246 748; DE-AS 1 271 405 and 1 301 502; US-PS 2,234,215, JP-A 60-31 510 (=58-136 824 of 28.07.1983)).

Polychloroprenes are valuable rubbers which are used for many applications. The vulcanizates of polychloroprene acquire their range of properties by addition to the crude rubber of additives, such as fillers, accelerators, vulcanization aids, antiagers and antifatigue agents and plasticizers, and subsequent vulcanization.

If the vulcanizates are molded in a metal mold, constituents of the mixture can foul the surface of the mold to such an extent that, after repeated use of the mold, defects appear in the surface of the finished article. The higher the level of mold fouling the more frequently the mold has to be cleaned, resulting ultimately in economic disadvantages through shorter machine service lives and higher cleaning costs.

Accordingly, there has been no shortage of attempts to produce polychloroprene with minimal mold fouling. Thus, it is proposed in JP-OS 74 37 118 to produce polychloroprene in the presence of resin soaps, alkali metal salts of saturated or unsaturated fatty acids and a sodium salt of a formaldehyde/naphthalene sulfonic acid condensate. However, the resulting reduction in the fouling of metal molds is not satisfactory. In addition, mold fouling cannot be avoided by the production of polychloroprene in the presence of ethylenically unsaturated and, hence, polymerizable styrene sulfonic acid and derivatives thereof (DE-OS 2 535 170 and JP-OS 78 04 031). DE-PS 3 321 902 describes the production of polychloroprene in the presence of polystyrene sulfonic acids and derivatives thereof and in the presence of resinic acid. Although polychloroprene rubbers having a minimal tendency to foul metal molds are obtained by this process, the high level of wastewater pollution which occurs during working up of the polymer is a disadvantage of this process.

Accordingly, the problem addressed by the present invention was to provide a process for the production of polychloroprene which would lead to products with a minimal tendency to foul metal molds, which would obtain the well-known favorable properties of polychloroprene and the use of which would be accompanied by lower levels of wastewater pollution.

According to the invention, this problem has been solved by the production of polychloroprene using unmodified resinic acids and, optionally, fatty acid esters. The polychloroprene rubbers obtained have a minimal tendency to foul metal molds, show favorable mechanical properties of the vulcanizates and can be produced with low levels of wastewater pollution.

Accordingly, the present invention relates to a process for the production of vulcanizable, mercaptan-and/or xanthogen disulfide-regulated polychloroprene rubber by emulsion polymerization of chloroprene and, based on polymerizable monomer used, 0 to 30 parts by weight and preferably 0 to 20 parts by weight of ethylenically unsaturated, other monomers copolymerizable with chloroprene in an alkaline medium, characterized in that (1) 0.1 to 10 and preferably 0.5 to 6 parts by weight of a tricyclic diterpene carboxylic acid containing at least two conjugated C=C double bonds per molecule, based on the polymerizable monomer used, and optionally (2) 0.1 to 5 and preferably 0.2 to 3 parts by weight, based on polymerizable monomer used, of fatty acid esters are used in the production process.

The tricyclic diterpene carboxylic acids to be used in accordance with the invention may be used in the form of the crude unmodified resinic acids (see W. Barendrecht, L. T. Lees in Ullmanns Encyclopädie der Technischen Chemie, 4th Edition, Vol. 12, 528–538, Verlag Chemie, Weinheim/New York 1976) which are obtained from tall oil, pine balsam or wood rosin, providing they are free from distillable constituents of turpentine oil which have been found to have an inhibiting effect.

If the tricyclic diterpene carboxylic acids themselves are readily obtainable, they may also be used in pure form.

Suitable tricyclic diterpene carboxylic acids are, for example, abietic acid, palustric acid, neoabietic acid and levopimaric acid.

The tricyclic, conjugated-unsaturated diterpene carboxylic acids may be identified in regard to type and quantity from a mixture of resinic acids by gas chromatography, for example in accordance with J. Amer. Oil Chem. Soc. 54, 289 (1977).

If an unmodified resinic acid obtained from tall oil, pine balsam or wood rosin is used, it naturally contains not only tricyclic, conjugated-unsaturated diterpene carboxylic acids, but also other constituents. Without being limiting in any way, the resinic acid obtained from tall oil with the following composition may be mentioned as an example of suitable commercially available, unmodified resinic acids:

|  | Content in % |
|---|---|
| Abietic acid | 40 |
| Neoabietic acid | 4 |

-continued

|  | Content in % |
|---|---|
| Palustric acid | 7 |
| Pimaric acid | 3 |
| Isopimaric acid | 6 |
| Dehydroabietic acid | 23 |
| Other resinic acids | 12 |
| Sum total of all resinic acids | 95 |
| Fatty acids | 2 |
| Combined acids | 1 |
| Non-saponifiable components | 2 |

(from a company specification of Bergvik Kemi AB, Söderhamn, Sweden).

The composition of an unmodified resinic acid obtained from pine balsam is mentioned as another example:

|  | Content in % |
|---|---|
| Abietic acid | 46 |
| Neoabietic acid | 16 |
| Palustric acid | 18 |
| Pimaric acid | 8 |
| Isopimaric acid | 1 |
| Other resinic acids | 10 |

In addition to the tricyclic, conjugated-unsaturated diterpene carboxylic acids, other emulsifying substances may also be used. For example, the addition of small quantities of a water-soluble salt of the condensate of naphthalenesulfonic acid and formaldehyde affords advantages in the working up of the polymer by the process of freeze coagulation (Chem. Engng., Progr. 43, 391 (1974), DE 1 051 506). The use of other emulsifying substances is limited where type and quantity pollute the wastewater to an unduly high level.

The tricyclic conjugated-unsaturated diterpene carboxylic acids may be used both in free form and in the form of water-soluble salts. If the free acid is used, it is preferably used in the form of a solution in the starting monomer. If the water-soluble salts of the diterpene carboxylic acids are used, they are used in the form of a solution in the aqueous phase.

By suitable fatty acid esters are meant those in which the basic fatty acids are unsaturated carboxylic acids containing 11 to 22 carbon atoms and saturated carboxylic acids containing 4 to 30 carbon atoms and also mixtures thereof. The alcohols on which the esters are based contain 1 to 12 carbon atoms.

Where polymerization is carried out in the presence of fatty acid esters, they may be added, for example, in the form of a solution in the monomer before the beginning of, during or after polymerization.

If the fatty acid esters are added after the latex has been freed from unreacted monomer, they may reasonably be added in the form of a dispersion.

Preferred ethylenically unsaturated "other monomers" copolymerizable with chloroprene include compounds containing 3 to 12 carbon atoms and 1 or 2 copolymerizable C=C double bonds per molecule. Examples of preferred "other monomers" are styrene, 2,3-dichlorobutadiene, 1-chlorobutadiene, butadiene, isoprene, acrylic acid, methacrylic acid, acrylonitrile and methacrylonitrile. The most important comonomers are 2,3-dichlorobutadiene and 1-chlorobutadiene.

The polychloroprenes according to the invention are produced by emulsion polymerization at 0° to 70° C. and preferably at 5° to 50° C. and at pH values of 8 to 14 and preferably 9 to 13. The polymerization reaction is activated by usual activators or activator systems.

Examples are formamidine sulfinic acid, potassium peroxodisulfate, redox systems based on potassium peroxodisulfate and, optionally, silver salt (Na salt of anthraquinone-$\beta$-sulfonic acid), in which case such compounds as, for example, formamidine sulfinic acid, the Na salt of hydroxymethane sulfinic acid, sodium sulfite and sodium dithionite are used as redox partners. Redox systems based on peroxides and hydroperoxides are also suitable. The production of the polychloroprenes according to the invention may be carried out both continuously and discontinuously.

The viscosity of the polychloroprenes according to the invention may be adjusted by the use of typical chain transfer agents, such as the mercaptans described, for example, in DE-OS 3 002 711, GB-PS 1,048,235, FR-PS 2 073 106, or the xanthogen disulfides described, for example, in DE-AS 1 186 215 in DE-OS 2 156 453, 2 306 610 and 3 044 811, in EP-PS 53 319, in GB-PS 512,458 and 952,156 and in US-PS 2,321,693 and 2,567,117.

Particularly preferred chain transfer agents are n-dodecyl mercaptan and the xanthogen disulfides used in DE-OS 3 044 811, DE-OS 2 306 610 and DE-OS 2 156 453.

After the polymerization reaction has been carried out to the required conversion, which is normally between 60 and 80% in the case of soluble polychloroprene and above 80% in the case of polychloroprene gel, it is of advantage to terminate the reaction by addition of known shortstopping agents, such as tert. butyl pyrocatechol, phenothiazine and diethyl hydroxylamine. Unreacted monomers can be removed by means of steam and vacuum.

The polymer produced by the process according to the invention may be worked up by known methods, for example by spray drying, freeze-drying or coagulation by addition of inorganic or organic salts, acids, bases or organic water-miscible solvents, such as alcohols and ketones. The preferred method of working up is freeze coagulation (Chem. Engng., Progr. 43, 391 (1974); DE-CI 1 051 506).

The stability of the polymer in storage can be improved by addition of usual phenolic, aminic, phosphorus-and sulfur-containing stabilizers.

The polychloroprene produced in accordance with the invention generally has a Mooney viscosity (according to DIN 53 525) of 5 to 140 MU (ML 1+4, 100° C.) and preferably 15 to 120 MU.

The polychloroprenes produced in accordance with the invention may be uncrosslinked, i.e. soluble in toluene, or crosslinked. Crosslinking is normally achieved by increased monomer conversion or by addition of crosslinking monomers during the polymerization. Polymer blends of crosslinked and uncrosslinked polychloroprenes known to the expert as gel/sol mixtures are normally used. Their production is described, for example, in EP 0 065 718, 0 303 089, DE 2 352 937, US 3,147,317.

The polychloroprenes produced in accordance with the invention may be vulcanized, for example, in the presence of vulcanization chemicals from the class of zinc and/or magnesium oxides, optionally after addition of fillers and, optionally, other additives at elevated temperature, typically at temperatures of 100° to 200° C.

The present invention also relates to the vulcanizates obtained from the polychloroprenes produced in accordance with the invention.

The following Examples are intended to illustrate the invention without limiting it in any way.

EXAMPLES (1) Production of the Examples according to the invention and Comparison Examples a) Formulations Production was based on the following formulation (quantities in parts by weight per 100 parts by weight monomers used):

|  | Examples | | Comparison Examples | | |
| --- | --- | --- | --- | --- | --- |
|  | 1 | 2 | 1 | 2 | 3 |
| Monomer phase | | | | | |
| Chloroprene | 95 | 95 | 95 | 95 | 95 |
| 2,3-Dichlorobutadiene | 5 | 5 | 5 | 5 | 5 |
| n-Dodecyl mercaptan | 0.3 | 0.3 | 0.3 | 0.3 | 0.3 |
| Aqueous phase | | | | | |
| Deionized water | 100 | 100 | 100 | 100 | 100 |
| Disproportionated[1] resin acid | — | — | 2.0 | 2.0 | 2.0 |
| Unmodified resinic acid based on tall oil | 2.0 | 3.0 | — | — | — |
| Condensation product of naphthalenesulfonic acid and formaldehyde (Na salt) | 0.2 | 0.2 | — | — | 0.2 |
| Poly-p-styrene sulfonic acid (Na salt), degree of polymerization 1300 | — | — | 3.0 | 0.75 | — |
| Sodium hydroxide | \multicolumn{5}{l}{The quantity was selected so that the pH value of the latex was 12.5} |
| Activator $K_2S_2O_8$ | 0.08 | 0.06 | 0.08 | 0.08 | 0.08 |
| Oleic acid methyl ester | 0.2 | — | — | — | — |

[1] see W. Barendrecht, L. T. Lees in Ullmanns Encyclopädie Technischen Chemie, Weinheim/New York 1976.

b) Test procedure

The aqueous phase and the monomer phase are introduced into a 250 liter reactor and purged with nitrogen. After the emulsion has been heated to 40° C., the polymerization reaction is initiated by addition of a small quantity of 0.5% aqueous potassium persulfate solution and is continued to a conversion of 70% by continuous addition of the same solution. After the conversion has been reached, the polymerization reaction is shortstopped by addition of 0.01 part tert. butyl pyrocatechol and 0.01 part phenothiazine in the form of an emulsion in toluene. Where oleic acid methyl ester is used, it is added in the form of a solution in chloroprene. The unreacted monomers are removed with steam to a residual monomer content of approx. 500 ppm.

c) Isolation of the polymer on a pilot plant scale

To obtain the relatively large quantities of polymer required for performance testing, the latices of Examples 1 and 2 according to the invention and the latices of Comparison Examples 1, 2 and 3 were worked up on a pilot-plant scale at pH 6.5 in accordance with the prior art as represented, for example, by Chem. Engng., Progr. 43, 391 (1974) and DE-Cl 1 051 506.

2) Performance tests

Using the polymers of Examples 1 and 2 according to the invention and Comparison Examples 1, 2 and 3, tests were conducted to determine the mechanical properties of the vulcanizates and their tendency to foul metal surfaces under vulcanization conditions. In addition, the Mooney viscosity (ML 1+4) was determined at 100° C. in accordance with DIN 53 525, Part 1-3.

To determine the mechanical properties of the vulcanizates, the polymers were used in the ISO mixture 2475 and vulcanized at 150° C.:

```
100.0 parts by weight polymer
  0.5 part by weight stearic acid
  2.0 parts by weight phenyl-β-naphthyl amine
 30.0 parts by weight carbon black (N 762)
  4.0 parts by weight magnesium oxide
  5.0 parts by weight zinc oxide active
  0.5 part by weight ethylene thiourea
```

Tensile strength, elongation at break and modulus at 300% elongation were determined on the vulcanizate after a vulcanization time of 30 minutes in accordance with DIN 53 504.

To determine mold fouling behavior, the polymers were used in the following mixture:

```
100.0 parts by weight polymer
  0.5 part by weight stearic acid
  4.0 parts by weight ®Maglite DE[1]
  5.0 parts by weight ®ZnO RS[2]
  0.8 part by weight ethylene thiourea
  0.8 part by weight ®Vulkacit Thiuram/C[3]
```

[1] Magnesium oxide, a commercial product of Merck & Co. Inc., USA
[2] Zinc oxide, a commercial product of Zinkweiß-For-schungsgesellschaft mbH
[3] Tetramethyl thiuram disulfide (vulcanization accelerator), a commercial product of Bayer AG, Leverkusen.

A mold developed at IKV Aachen for injection molding (P. Barth, Spritzgießen von Gummiformteilen, pp. 85 et seq. VDI-Verlag 1988) was used to measure mold fouling. The unit used was a No. 962 injection molding machine of the type manufactured by DESMA (Achim).

In order to obtain a reliable evaluation, 200 injection cycles were carried out. The temperature was 200° C. and the vulcanization time was 2 minutes for each injection cycle.

The evaluation criterion was the appearance of the injection mold. The appearance of the mold cavity and the appearance of edges and fittings in the mold are particularly important in this regard. Diesel effects and the beginning of deposits can be clearly observed at these places.

The results of all the observations were evaluated on the following scale:

| No mold fouling | 1 |
| --- | --- |
| Slight mold fouling | 2 |
| Moderate mold fouling | 3 |
| Heavy mold fouling | 4 |
| Very heavy mold fouling | 5 |

The results of the performance tests are set out in Table 1.

TABLE 1

Results of performance tests on the polymers produced in accordance with the invention
(Examples 1 to 2) and the polymers produced in accordance with the prior art
(Comparison Examples 1, 2 and 3)

|  | ML 1 + 4/ 100° C. (MU) | Tensile strength (MPa) | Elongation at break (%) | Modulus 300% (MPa) | Evaluation of mold fouling |
|---|---|---|---|---|---|
| Example 1 | 49 | 15.9 | 340 | 13.6 | 1 |
| Example 2 | 52 | 16.3 | 350 | 13.0 | 2 |
| Comparison Example 1 | 54 | 15.3 | 340 | 12.5 | 2 |
| Comparison Example 2 | 52 | 15.2 | 340 | 12.4 | 3 |
| Comparison Example 3 | 50 | 14.7 | 350 | 12.1 | 4–5 |

3) Determination of wastewater pollution during working up

The pollution of wastewaters by the latices freed from unreacted monomers obtained by the process according to the invention (Example 1) and in accordance with the prior art (Comparison Example 1) was determined by working up to isolate the polymer by freeze coagulation under defined conditions.

Starting out from a polymer concentration of 25% by weight, two polymer sheets of each latex were frozen in a stainless steel tank exposed to a temperature of −50° C. To this end, the latices were adjusted from pH 12.5 to pH 6.5 with 20% acetic acid. 100 g latex was used for each sheet. Through the use of equal quantities of latex and the same stainless steel tank, the thickness of each sheet was the same. Sheet thickness was thus prevented from influencing the efficiency of washing. The dimensions of the sheets were 28×18 cm for a thickness of 2 mm.

The two frozen sheets of each latex were suspended in a tank filled with 2,500 ml deionized water and left therein for 30 minutes. The sheets were freed from water to a residual moisture content of 30% by means of a small squeezing roller and the water removed by squeezing was combined with the washing water in the tank to form the wastewater. The COD value of this wastewater was determined in accordance with DIN 38 409 H 41/1. The following results were obtained:

TABLE 2

| COD values of the wastewaters accumulating during working up | | |
|---|---|---|
|  | COD (mg/l) | g COD per kg polychloroprene produced |
| Example 1 | 210 | 11 |
| Comparison Example 1 | 1,160 | 61 |

4) Evaluation of the results obtained

Comparison of the results set out in Tables 1 and 2 shows that the production process according to the invention (Examples 1 and 2) has advantages over the process used in the prior art (Comparison Examples 1, 2 and 3).

In the process according to the most recent prior art, the polymer obtained shows as slight a tendency towards mold fouling as the polymers produced in accordance with the invention (Examples 1 and 2, Table 1) only if a large quantity of poly-p-styrene sulfonic acid is used (Comparison Example 1, Table 1).

However, the resulting much higher pollution of wastewater compared with the process according to the invention (see Table 2, Example 1 and Comparison Example 1) is a disadvantage.

If a small quantity of poly-p-styrene sulfonic acid is used (Comparison Example 2), the polymer shows greater mold fouling than the polymers produced in accordance with the invention (Examples 1 and 2).

The sole use of disproportionated abietic acid (Comparison Example 3) leads to the greatest fouling of molds.

We claim:

1. A process for the production of at least one of vulcanizable mercaptan-regulated polychloroprene rubber and vulcanizable xanthogen-disulfide regulated polychloroprene rubber wherein the process comprises the emulsion polymerization of chloroprene and, based on polymerizable monomer used, 0 to 30 parts by weight ethylenically unsaturated, other monomers copolymerizable with chloroprene in an alkaline medium, wherein (1) 0.1 to 10 parts by weight of a tricyclic diterpene carboxylic acid containing at least two conjugated C═C double bonds per molecule, based on the polymerizable monomer used, and (2) 0.1 to 5 parts by weight, based on polymerizable monomer used, of fatty acid esters based on unsaturated carboxylic acids containing 11 to 22 carbon atoms and mixtures thereof, are used in the production process.

2. A process for the production of at least one of vulcanizable mercaptan-regulated polychloroprene rubber and vulcanizable xanthogen-disulfide regulated polychloroprene rubber wherein the process comprises the emulsion polymerization of chloroprene and further wherein the following substances are present in the indicated amounts during the process:

(1) 0 to 30 parts by weight, based on polymerizable monomer used, of ethylenically unsaturated, other monomers which are copolymerizable with chloroprene in an alkaline medium, said other monomers comprising compounds containing 3 to 12 carbon atoms and 1 or 2 copolymerizable C═C double bonds per molecule;

(2) 0.5 to 6 parts by weight of a tricyclic diterpene carboxylic acid containing at least two conjugated C═C double bonds per molecule, based on the polymerizable monomer used; and (3) 0.1 to 5 parts by weight, based on the polymerizable monomer used, of fatty acid esters.

3. A process for the production of at least one of vulcanizable mercaptan-regulated polychloroprene rubber and vulcanizable xanthogen-disulfide regulated polychloroprene rubber wherein the process comprises the emulsion polymerization of chloroprene and, based on polymerizable monomer used, 0 to 30 parts by weight ethylenically unsaturated, other monomers copolymerizable with chloroprene in an alkaline medium, wherein (1) 0.1 to 10 parts by weight of a tricyclic diterpene carboxylic acid containing at least two conjugated C=C double bonds per molecule, based on the polymerizable monomer used, and (2) 0.1 to 5 parts by weight, based on polymerizable monomer used, of fatty acid esters based on saturated carboxylic acids containing 4 to 30 carbon atoms and mixtures thereof, are used in the production process.

4. A process for the production of at least one of vulcanizable mercaptan-regulated polychloroprene rubber and vulcanizable xanthogen-disulfide regulated polychloroprene rubber wherein the process comprises the emulsion polymerization of chloroprene and, based on polymerizable monomer used, 0 to 30 parts by weight ethylenically unsaturated, other monomers copolymerizable with chloroprene in an alkaline medium, wherein (1) 0.1 to 10 parts by weight of a tricyclic diterpene carboxylic acid containing at least two conjugated C=C double bonds per molecule, based on the polymerizable monomer used, and (2) 0.1 to 5 parts by weight, based on polymerizable monomer used, of fatty acid esters based on mixtures of unsaturated carboxylic acids containing 11 to 22 carbon atoms and saturated carboxylic acids containing 4 to 30 carbon atoms, are used in the production process.

5. A process for the production of at least one of vulcanizable mercaptan-regulated polychloroprene rubber and vulcanizable xanthogen-disulfide regulated polychloroprene rubber wherein the process comprises the emulsion polymerization of chloroprene and, based on polymerizable monomer used, 0 to 30 parts by weight ethylenically unsaturated, other monomers copolymerizable with chloroprene in an alkaline medium, wherein (1) 0.1 to 10 parts by weight of a tricyclic diterpene carboxylic acid containing at least two conjugated C=C double bonds pere molecule, based on the polymerizable monomer used, and (2) 0.1 to 5 parts by weight, based on polymerizable monomer used, of fatty acid esters based on alcohols containing 1 to 12 carbon atoms and mixtures thereof, are used in the production process.

6. A process according to claim 2, wherein said other monomers are selected from the group consisting of styrene, 2,3-dichlorobutadiene, 1-chlorobutadiene, butadiene, isoprene, acrylic acid, methacrylic acid, acrylonitrile and methacrylonitrile.

7. A process for the production of at least one of vulcanizable mercaptan-regulated polychloroprene rubber and vulcanizable xanthogen-disulfide regulated polychloroprene rubber wherein the process comprises the emulsion polymerization of chloroprene and further wherein the following substances are present in the indicated amounts during the process:

(1) 0 to 30 parts by weight, based on polymerizable monomer used, of ethylenically unsaturated, other monomers which are copolymerizable with chloroprene in an alkaline medium;

(2) 0.5 to 6 parts by weight of a tricyclic diterpene carboxylic acid containing at least two conjugated C=C double bonds per molecule, based on the polymerizable monomer used; and (3) 0.1 to 5 parts by weight, based on the polymerizable monomer used, of fatty acid esters based on unsaturated carboxylic acids containing 11 to 22 carbon atoms, saturated carboxylic acids containing 4-30 carbon atoms or mixtures thereof.

8. A process for the production of at least one of vulcanizable mercaptan-regulated polychloroprene rubber and vulcanizable xanthogen-disulfide regulated polychloroprene rubber wherein the process comprises the emulsion polymerization of chloroprene and further wherein the following substances are present in the indicated amounts during the process:

(1) 0 to 30 parts by weight, based on polymerizable monomer used, of ethylenically unsaturated, other monomers which are copolymerizable with chloroprene in an alkaline medium;

(2) 0.5 to 6 parts by weight of a tricyclic diterpene carboxylic acid containing at least two conjugated C=C double bonds per molecule, based on the polymerizable monomer used; and (3) 0.1 to 5 parts by weight, based on the polymerizable monomer used, of fatty acid esters based on alcohols containing 1 to 12 carbon atoms.

9. A process for the production of at least one of vulcanizable mercaptan-regulated polychloroprene rubber and vulcanizable xanthogen-disulfide regulated polychloroprene rubber wherein the process comprises the emulsion polymerization of chloroprene and further wherein the following substances are present in the indicated amounts during the process:

(1) 0 to 30 parts by weight, based on polymerizable monomer used, of ethylenically unsaturated, other monomers which are copolymerizable with choloroprene in an alkaline medium;

(2) 0.5 to 6 parts by weight of a tricyclic diterpene carboxylic acid containing at least two conjugated C=C double bonds pere molecule, based on the polymerizable monomer used; and (3) 0.1 to 5 parts by weight, based on the polymerizable monomer used, of fatty acid esters, wherein said fatty acid esters comprise oleic acid methyl ester.

10. A process according to claim 2, wherein said fatty acid esters are present during said process in the form of a solution in the chloroprene either before or during said emulsion polymerization.

* * * * *